US010272815B2

United States Patent
De Ceuster

(10) Patent No.: US 10,272,815 B2
(45) Date of Patent: Apr. 30, 2019

(54) TRAILER AND METHOD FOR LOWERING AND LIFTING THE CARGO CONTAINER OF A TRAILER

(71) Applicant: TRIMORK, gewone commanditaire vennootschap, Heist-op-den-Berg (BE)

(72) Inventor: Ludo Leopold Louisa De Ceuster, Itegem (BE)

(73) Assignee: TRIMORK, GEWONE COMMANDITAIRE VENNOOTSCHAP, Heist-op-den-Berg (BE)

( * ) Notice: Subject to any disclaimer, the term of this patent is extended or adjusted under 35 U.S.C. 154(b) by 0 days.

(21) Appl. No.: 15/319,913

(22) PCT Filed: May 21, 2015

(86) PCT No.: PCT/IB2015/053753
§ 371 (c)(1),
(2) Date: Dec. 19, 2016

(87) PCT Pub. No.: WO2015/193755
PCT Pub. Date: Dec. 23, 2015

(65) Prior Publication Data
US 2017/0120793 A1    May 4, 2017

(30) Foreign Application Priority Data
Jun. 20, 2014 (BE) .................. 20140483

(51) Int. Cl.
*B60P 1/06* (2006.01)
*B60P 1/28* (2006.01)

(52) U.S. Cl.
CPC ............. *B60P 1/283* (2013.01); *B60P 1/06* (2013.01); *B60P 1/28* (2013.01)

(58) Field of Classification Search
CPC .................. B60P 1/283; B60P 1/06
(Continued)

(56) References Cited

U.S. PATENT DOCUMENTS

| 859,971 A * | 7/1907 | Palm ................... B60P 1/34 298/11 |
| 3,833,263 A * | 9/1974 | Jackson ............... B65G 7/08 298/17.5 |

(Continued)

FOREIGN PATENT DOCUMENTS

| DE | 858 360 C1 | 12/1952 |
| FR | 2 436 037 A1 | 4/1980 |
| WO | 2012/005776 A | 1/2012 |

OTHER PUBLICATIONS

International Search Report, dated Aug. 21, 2015, from corresponding PCT application.

*Primary Examiner* — Stephen T Gordon
(74) *Attorney, Agent, or Firm* — Young & Thompson

(57) ABSTRACT

A trailer with a trailer bed (2) and a wheel axis (4) that is mounted on a shaft (3), wherein the trailer bed (2) along with the shaft (3) and the wheel axis (4) are connected by a lifting device (10), the lifting device (10) is pivotable around the wheel axis (4) mounted on the shaft (3), the trailer bed (2) is tiltable around a hanging axis (14) connected with the lifting device (10), which hanging axis (14) is mounted fixed with the trailer bed (2), and the distance (B) between the hanging axis (14) and the wheel axis (4) is at least equal to the distance (D/2) between the wheel axis (4) and the front-end (7) of the trailer bed (2).

10 Claims, 3 Drawing Sheets

(58) Field of Classification Search
USPC ...... 298/10, 11, 17.5, 17.8, 22 F, 22 J, 22 D, 298/21 V, 19 V
See application file for complete search history.

(56) References Cited

U.S. PATENT DOCUMENTS 3,944,095 A     3/1976   Brown
5,513,901 A *   5/1996   Smith ........................ B60P 1/34
                                                                 298/22 D \* cited by examiner

TRAILER AND METHOD FOR LOWERING AND LIFTING THE CARGO CONTAINER OF A TRAILER

BACKGROUND OF THE INVENTION

The present invention relates to a trailer, more particularly, the invention relates to a trailer that exists from a trailer bed, a shaft and an axis, were this invention is meant to simplify the loading and unloading of a trailer.

Conventional trailers with a shaft and an axis are used to transport heavy and/or big loads.

To get these loads into the bed of the trailer, the user can use loading ramps or wooden planks so that any load can be driven onto the trailer bed by for example a wheelbarrow or a motorcycle A disadvantage of this kind of loading is that the user has to have these loading boards with him if he wants to load his trailer this way. And, more importantly, the use of these loading ramps isn't without any danger: the wheel of the wheelbarrow could, per accident, be driven or slip off these loading ramps.

Therefore there are ways to make loading and unloading heavy cargo onto the bed of the trailer easier and safer.

A known way to do this is to tilt the bed of the trailer, so that one side of the bed touches the ground, like in example WO 2012/005776. This way, the cargo can be loaded onto the bed of the trailer.

A disadvantage of this way of loading is that, because the trailer bed is in a slanted position, the cargo has to be pushed upward.

Plus, there is a chance that when the cargo is pushed over the tipping point, the bed of the trailer would suddenly flip back, which could result in a dangerous situation.

Therefore, we can say it is much safer to be able to lower the bed of the trailer flat onto the ground.

A known way to do this is to use expensive and heavy hydraulics, this way the bed of the trailer can be lowered flat onto the ground. The bed of the trailer can for example be tilted or lifted from the chassis, which holds the axis, and eventually be lowered and placed onto the ground.

Conventional trailers like this are expensive and unaffordable for the individual user because they require heavy investments. Plus, hydraulics consist of complex mechanisms that are vulnerable to defects and/or wear and need maintenance.

Another known way to easily lower the bed of a trailer onto the ground is to leave the central axis out, like in example FR 2.436.037. The problem and disadvantage with this is that the stability of the trailer will greatly suffer.

SUMMARY OF THE INVENTION

The objective of the present invention is to provide a solution to at least one of the aforementioned disadvantages.

In accordance with the present invention, there is provided a trailer with a trailer bed and an axis that mounted on a shaft, where the trailer bed is connected with the shaft and the axis by means of a lifting device, in which the lifting device is pivotally around the axis that is mounted on the shaft, where the trailer bed is pivotally around a hanging axis that is connected with the lifting device, in which the hanging axis is mounted fixed on the trailer bed, where the distance between the hanging axis and the axis is at least equal to the distance between the axis and the front-end of the trailer bed where the shaft is and the front-end of the trailer bed is parallel with the axis.

Advantageously, the lifting device can easily bring the trailer bed to a ground level, so that the trailer bed is horizontally flat on the ground.

This can be done by tilting the bed of the trailer so that the rear-end, opposite of the aforementioned front-end, can rest on the ground and that the shaft and axis can be pulled out from under the trailer bed. The lifting device will work as a support, so the trailer bed will come to hang from the hanging axis while this motion takes place.

Because the distance between the hanging axis and the wheel axis is at least or equal the distance between the wheel axis and the front-end of the trailer bed, the shaft and wheel axis can be totally removed from under the trailer.

An advantage of this way of loading and unloading is that the wheel axis won't be interrupted, which means that the trailer will keep its stability.

Preferable, the wheel axis is located at the location or approximately at the location of the center of gravity of the trailer bed when the trailer bed is on the shaft.

This will increase stability and balance and will add more driving comfort.

It is also clear that, preferably, the load is to be put in the center of gravity of the trailer bed so that balance is maintained.

A characteristic of this invention is that the hanging axis is located between the aforementioned front-end of the trailer bed and the wheel axis when the trailer bed is on the shaft. Preferably, the hanging axis is at some distance above the cargo container.

This will make that when the trailer bed is tilted the hanging axis will be located somewhere above the wheel axis, so the trailer bed which is now hanging from the hanging axis finds itself in a stable position. Plus, the shaft and wheel axis can now be easily moved from under the trailer bed.

The present invention also describes a way of unloading the bed of a trailer to the groundlevel, were one of the aformentioned methods are used, which include;

tilting of the trailer bed when it is at transport level, so that the aforementioned front-end of the trailer bed touches the ground.

moving the shaft so that the wheel axis will come from under the front-end of the cargo container.

with the help of the lifting device automatically lowering the trailer bed's front-end by moving the shaft and bringing the trailer bed to a ground level.

The present invention also describes a way of loading a bed of a trailer from a ground level to a transport level, where one of the to be claimed devices is used and which includes:

bringing the shaft to the cargo container by using the wheel axis, when the trailer bed is on a ground level, automatically lifting the front-end of the trailer bed with the lifting device by moving the shaft so that the wheel axis can come from under the trailer bed.

when the wheel axis touches the trailer bed, tilting the trailer bed so that the rear-end lifts up to a transport level.

Advantageously, the loading and handling of heavy or big cargo will be very easy and by implementing this lifting device and the trailer bed can easily be lowered to or raised from the ground.

BRIEF DESCRIPTION OF THE DRAWINGS

As an insight to the present invention, hereafter are a few, as example and without limitations, different preferably variant describings of a trailer that uses the present invention, with appropriate references to the accompanying drawings.

DETAILED DESCRIPTION OF THE INVENTION

Figure 1:
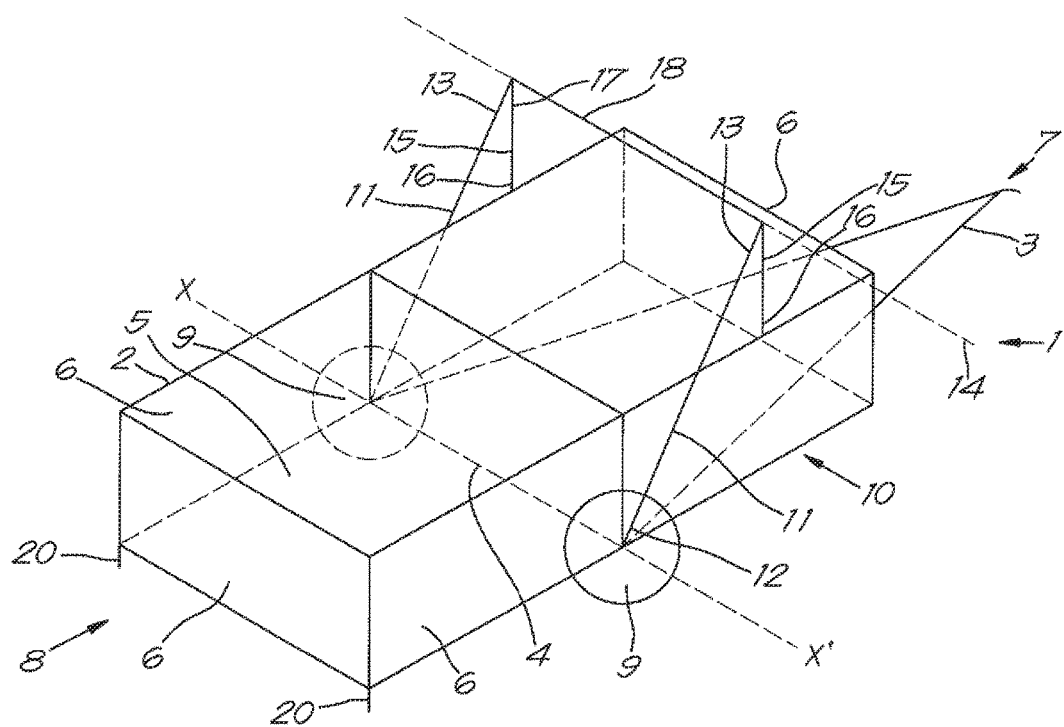
FIG. 1 shows schematically and in perspective view of the invented trailer.

FIG. 1 mainly shows a trailer 1 with a trailer bed 2 and a shaft 3 with a wheel axis 4. The trailer bed 2 is now on transport level. The trailer bed 2 is in this case a open bed with an bottom 5 and four sides 6, but this hasn't has to be in every case.

The front-end 7 of the trailer bed 2 is parallel with the direction X-X' of the axis 4 and is attached to the side of the shaft 3. At the rear end 8 of the trailer bed 2, at the opposite side of the front 7, is a side 6 of the trailer bed 2 that is capable of opening.

The wheel axis 4 has two wheels 9 and is attached to the shaft 3, shown with a dotted line in FIG. 1, but this hasn't has to be in every case.

The shaft 3 and the wheel axis 4 are forming a chassis when the trailer bed 2 is on a transport level and on the shaft 3. The wheel axis 4 is in this case at the position of the center of gravity of the trailer bed 2, like shown in FIG. 1. This will make that the trailer bed 2 is stable.

The trailer 1 is also equipped with lifting device 10 that are in this case two rods 11 who are with their one end pivotally in an vertical plane around the wheel axis 4 that is mounted on the shaft 3 at both sides of the trailer bed 2 and with their other ends 13 are pivotally around a hanging axis 14 connected to the trailer bed 2. The hanging axis 14 is parallel with the direction X-X' of the wheel axis 4. This lifting device 10 is very simple and not expensive to implement.

The hanging axis 14 is made by two uprising rods 15 who are with their one end 16 mounted fixed on the trailer bed 2 and with their other end 17 define the hanging axis 14, where the aforementioned end 17 of the rods 15 is connected to.

This way the hanging axis 14 is located on a given distance A above the bottom of the trailer bed 2.

The hanging axis 14 is located between the front-end 7 of the trailer bed 2 and the wheel axis 4 when the trailer bed 2 is on the shaft 3. In this situation the hanging axis 14 is located halfway between the front-end 7 and the wheel axis 4.

It is important to notice that the hanging axis 14 is mounted fixed on the trailer bed 2, while the wheel axis 4 is connected fixed with the shaft 3.

The length of the rods 11 and the uprising rods 15 and the position of the hanging axis 14 and the wheel axis 4 are this way that the distance B between the hanging axis 14 and the wheel axis 4 are always equal to the distance D/2 between the wheel axis 4 and the front-end 7 of the trailer bed 2. This way we create a equilateral triangle between the points 4, 14 and E in FIG. 2.

In the shown example, where the wheel axis 4 is located at the center of gravity of the trailer bed 3, where the hanging axis 14 is located halfway between the front-end 7 and the wheel axis 4, the distance B is equal to the distance C. The connection between distance A, B and C in relation with the distance D of the cargo container 2 can be determined with following formula:

$$A^2 = B^2 - (D/4)^2 \text{ or } A^2 = C^2 - (D/4)^2$$

were D is the length of the trailer bed 2.

Figure 2:
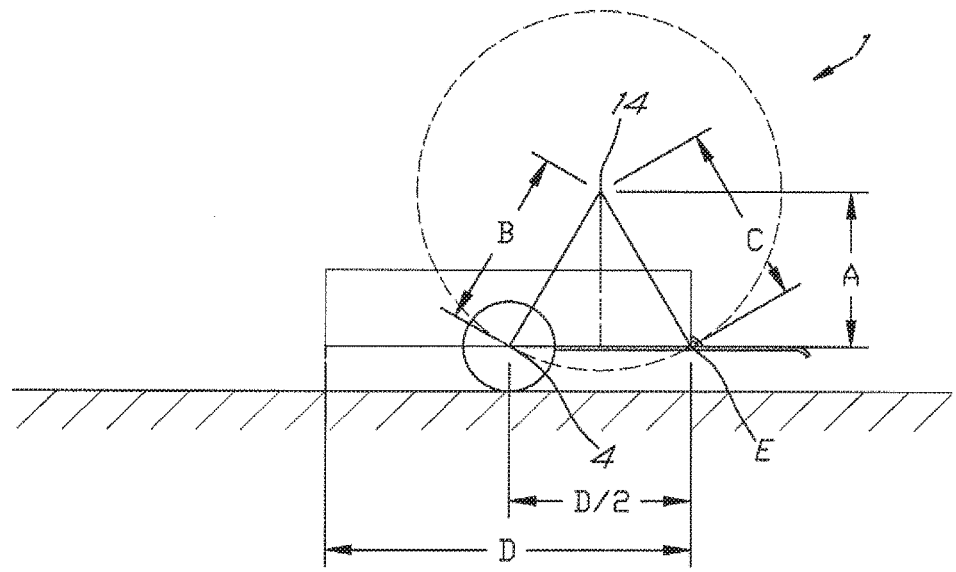
FIG. 2 shows a simplified side view of FIG. 1.

This formula is easily seen on FIG. 2, where the equilateral triangle between the hanging axl 14, the wheel axis 4 and point E at the front-end 7 of the trailer bed 2 is shown.

In this figure are the distances B and C equally determined by D/2 and preferably the distance A in at least greater than:

$$A^2 = (D/2)^2 - (D/4)^2$$

With the help of this formula only the length D of the trailer bed 2 is needed to determine the distance A, and so determine the location of the hanging axis 14.

The circle with midpoint the hanging axis 14 and the distance B as his radius will clearly show that there are no conflicts between the wheel axis 4 and the front end 7 of the trailer bed 2. In other words: the wheel axis 4 can fully move from under the trailer bed 2 in order to get the trailer bed 2 onto the groundlevel.

To create more stability to the aforementioned lifting device 10 and the uprising rods 15 it is possible to connect the uprising rods 15 with a cross-bar 18 to create a bridge, where the cross-bar joins or almost joins the hanging axis 14. It is clear that this cross-bar 18 is not necessary.

In this case, there are means 19 that allow to connect the trailer bed to the shaft 3 or to lock it, by for example a lock or some sort. This will make sure that the trailer bed 2 cannot unintentionally or unwanted tip over. These means 19 are very important for safety.

In this case, though not necessarily, the rods 11 of the lifting device 10 are disconnectable from the hanging axis 14, this means from the uprising rods 15. It is also possible to disconnect the lifting device 10 from the wheel axis 4.

This creates the advantage to be able to pick up and load multiple trailer beds 2, this means the individual can handle multiple trailer beds individually and only has to own one axis 4.

The trailer bed 2 is in this case at the rear-end 8, this means the opposite end of the aforementioned front-end 7, equipped with at least one foldable support 20. In this case there are two of these supports 20, at the described corners of the trailer bed.

The supports 20 are perpendicular with the ground and are foldable towards the front-end 7 of the trailer bed 2.

The working method of this trailer 1 and especially the method for loading and unloading the trailer bed 2 are very simple and work as followed.

Figure 3:
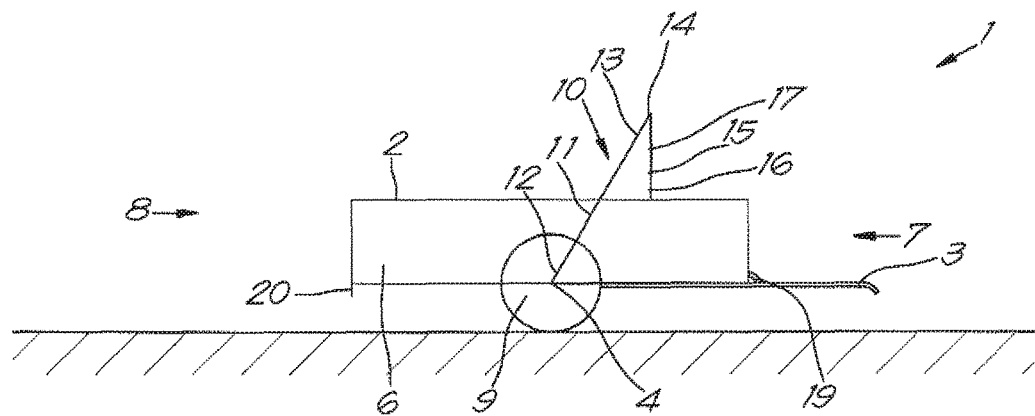
FIG. 3 shows a side view of FIG. 1.

We assume that the trailer 1 contains of a trailer bed 2 on transport level, as shown in FIG. 3, where the trailer 1 with the help of the shaft 2 can be connected to an automobile or sort in order so that it can be transported.

In this position the trailer bed 2 is finding it's support onto the wheel axis 4 or in other words: the wheel axis 4 forms a support point for the trailer bed 2. The axis 2 is also the center of gravity and centerpoint of the cargo trailer bed 2. This point is also the point of application, or the point where gravity works in.

To load or unload a heavy load onto the trailer 2, like for example a cement mixer, the means 19 have to be disconnected.

After this the trailer bed 2, which is now on a transport level, is tilted so that the rear-end 8 of the trailer bed 2 is touching the ground.

When the means 19 are implemented under the form of a winche, the tilting can be controlled by the winche.

Figure 4:
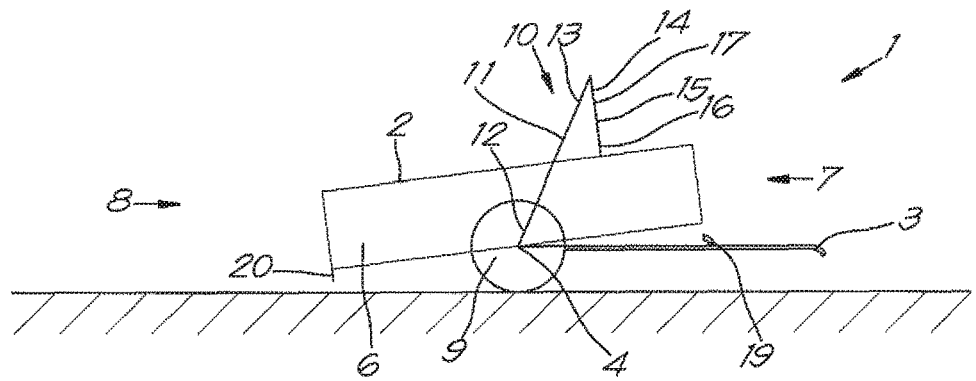
FIGS. 4 until 7 show an schematic view of the different actions of the invention.

As shown in FIG. 4, the trailer bed 2 will now rest on the ground supported by the foldable supports 20.

By this action the fulcrum, or in other words the weight of the trailer bed 2, will now partially be moved to the point were the foldable supports 20 rest on the ground.

As a result of this tilting motion the hanging axis 14 will move slightly closer to the perpendicular line that runs trough the wheel axis 4. This is a result of the hanging axis 14 being halfway between front-end 7 and the wheel axis 4 and that the hanging axis 14 is at some given distance A above the trailer bed 2.

Figure 5:
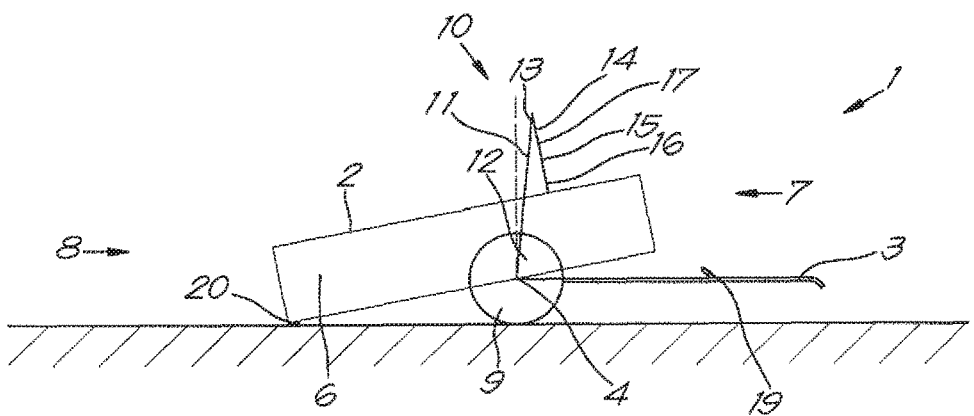

In the next step we will, with the help of a little push against the trailer bed 2, flip the foldable supports which will make the rear-end of the trailer bed 2 hit the ground. This is shown in FIG. 5.

As a result of this action, which is very easy to do because of these foldable supports 20, the hanging axis 14 will now be located on the aforementioned perpendicular line. This action will make sure that the point of application will be moved to the hanging axis 14 because gravity will look for a new point of application. In other words: the trailer bed 2 is hanging on the hanging axis 14.

A hanging object is very agile, in contrast to an object that is supporting on the ground.

This has the advantage that the weight of the cargo trailer bed 2 keeps finding it's support on the wheel axis 4 by the use of the lifting device 10, but the point of application has rapidly moved to the hanging axis 14. The fulcrum and centerpoint are now located directly under the hanging axis 14 where the trailer bed 2 is hanging from, so that the trailer bed 2 is hanging stable.

Figure 6:
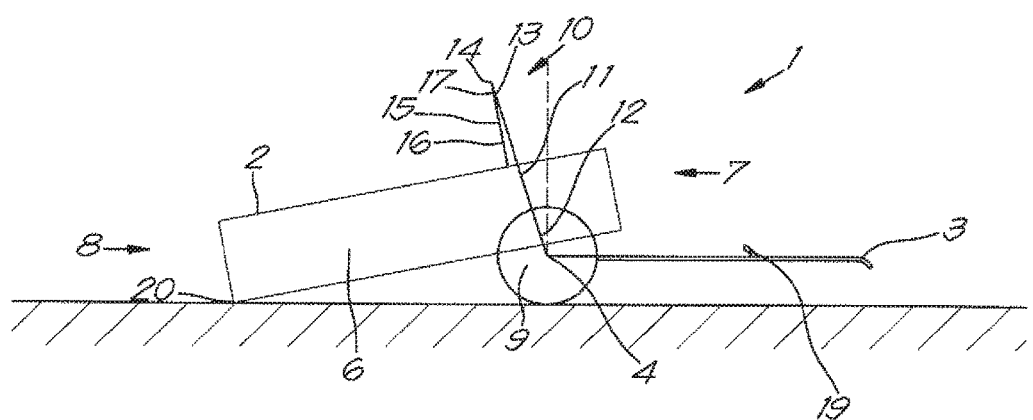

In a next step, we will be able to move the shaft 3 forward, with for example a car or sorts. This is shown in FIG. 6.

Because the point of application or the hanging axis 14 is located as good as directly above the wheel axis 4, the shaft 3 can now be easily driven from under the trailer bed 2.

Because the hanging axis 14 is located above the wheel axis 4, the wheel axis 4 does not have to be pulled from under the hanging axis 14, which would require a great amount of force.

By moving the shaft 3 the trailer bed will be automatically lowered by the lifting device 10, where the rods 11 and the uprising rods 15 make an scissory motion.

Because the distance B between the hanging axis 14 and the wheel axis 4 is equal to or greater than the distance between the wheel axis 4 and the front-end 7 of the trailer bed 2, the wheel axis 4 can be fully driven from under the trailer bed 2.

Figure 7:
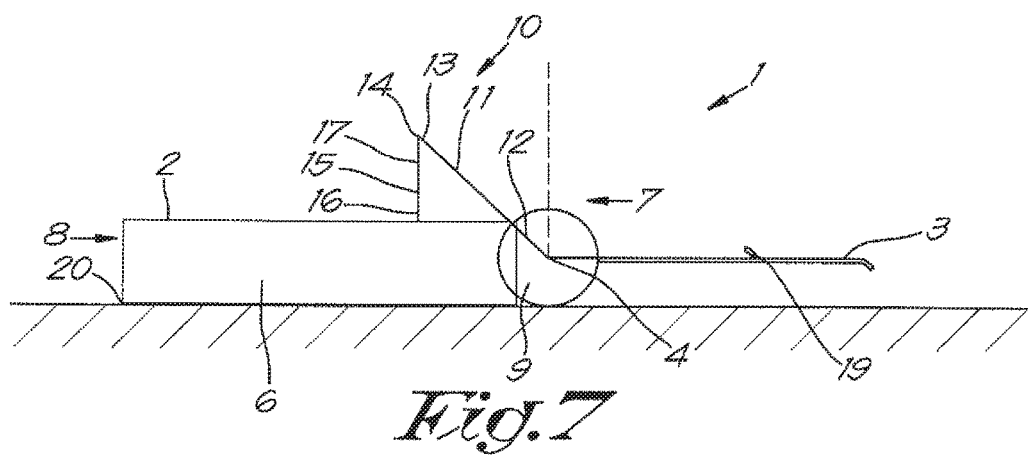

The trailer bed 2 is now at ground level. This is shown in FIG. 7. The cargo can now be driven or loaded onto the trailer bed 2, in some cases after the lowering of the side 6 at the rear-end 8.

Because the aforementioned rods 11 of the lifting device 10 can be disconnected from the hanging axis 14, the shaft 3 along with the lifting device 10 can be disconnected from the trailer bed 2. This will allow the individual to load a different trailer bed 2 with the shaft 3 and make it ready for transport.

When the cargo is placed on the center of gravity from the trailer bed 2, the trailer bed 2 can with the help of the lifting device 10 automatically be placed on the shaft 3. The following steps describe these actions:

bringing the shaft 3 back to the trailer bed 2 with the wheel axis 4, when the trailer bed 2 is located horizontally on the ground-level.

with the help of the lifting device 10 automatically lifting the front-end 7 of the trailer bed 2 by moving the shaft 3 so that the wheel axis 4 is moved under the trailer bed 2;

when the wheel axis 4 touches the trailer bed 2, the tipping of the trailer bed 2 so that the rear-end 8 lifts upward and that the trailer bed 2 gets to a transport level.

To tilt the trailer bed 2, as described last step above, we can use any means like for example a winch. In other words, the tilting of the trailer bed 2 can be executed by pulling or winching the trailer bed 2 so that the front end of the trailer bed 2 will be pulled towards the shaft 3.

This way the tilting of the trailer bed 2 will be done in a controlled manner. So if there is a given load or weight on the trailer bed 2, the tilting of the trailer bed 2 does not have to be done by hand, which would be impossible if the load was very heavy or for some reason has not been placed at the center or fulcrum.

Bringing the shaft 3 to the trailer bed 2 can easily be done by driving a vehicle backwards towards the trailer bed 2.

As you can in FIG. 7, the front-end of the trailer bed 2 will always be between the rods 11, this way the rods 11 act as a guiding path when the trailer bed 2 is lowered or raised.

It is important to notice that when lifting the trailer bed 2 by moving the shaft 3, the hanging axis 14 will automatically rise because of the rods 11 of the lifting device 10 which will make a scissor movement, the reversed movement as from lowering the trailer bed 2.

Also, the midpoint of the trailer bed 2 will come together with the wheel axis 4 the moment the trailer bed 2 touches the wheel axis 4. Because the trailer bed 2 is balanced on the wheel axis 4 the tilting of the trailer bed can easily be done.

These two aspects make the lifting of the trailer bed 2 to a transport level an easy job.

When the trailer bed 2 is horizontally on the shaft 3, the trailer bed 2 can be connected onto the shaft 3 with the aforementioned means 19, so that the trailer bed 2 cannot tilt backwards. This will ensure safety while transporting.

The cargo can now be transported with the trailer 1.

It is possible to lower the lifting device 10. In other words, the rods 11 and the uprising rods 15 can be tilted or rotated so that they are perpendicular with the bottom 5 of the cargo container 2.

This has an advantage in transport or storing the trailer 1, so that the lifting device 10 is less of an obstacle.

Although the present invention and the mechanism for lowering and loading the bed from the trailer has been explained in relation to its preferred embodiment(s) as mentioned above, it is to be understood that many other possible modifications and variations can be made without departing from the scope of the invention. It is, therefore, contemplated that the appended claim or claims will cover such modifications and variations that fall within the true scope of the invention.

The invention claimed is:
1. A trailer comprising:
a trailer bed (2) with a length (D),
a trailer chassis comprising a drawbar (3), where the drawbar is situated, and wheels that define a wheel axis (4),
a lifting device (10) comprising a first part pivotably connected to the trailer chassis and a second part rigidly connected to the trailer bed, wherein the first part and the second part pivot with respect to each other, and a hanging axis defined by where the first part and the second part pivot with respect to each other, wherein the hanging axis (14) is parallel to the wheel axis (4) and is positioned above the trailer bed (2) and/or above the trailer chassis during use of the lifting device, wherein the trailer bed (2) is separably connected to the trailer chassis by means of the lifting device (10), wherein the hanging axis (14) is pivotable around the wheel axis (4), wherein the trailer bed (2) hangs from the hanging axis (14) when the lifting device is in use, wherein, when the trailer bed is positioned on the trailer chassis, the distance (B) between the hanging axis (14) and the wheel axis (4) is at least equal to half the length (D) of the trailer bed.

2. A trailer in accordance with claim 1, wherein the first part of the lifting device (10) comprises two rods (11) which are with a bottom end (12) pivotable in a vertical plane and mounted on the trailer chassis and which are with a top end pivotable around the hanging axis (14).

3. A trailer in accordance with claim 2, wherein the second part of the lifting device (10) comprises two uprising rods (15) which are with a bottom end (16) rigidly connected to the trailer bed (2) and with a top end pivotably connected to the two rods (11) of the first part of the lifting device, wherein the connection defines the hanging axis (14).

4. A trailer in accordance with claim 3, wherein the two rods (15) comprising the second part of the lifting device are connected by means of a crossbar (18) to form a bridge, where the crossbar (18) joins the hanging axis (14).

5. A trailer in accordance with claim 1, wherein when the trailer bed (2) is on the trailer chassis, the wheel axis (4) is situated or approximately situated at the center of gravity of the trailer bed (2).

6. A trailer in accordance with claim 1 wherein, when the trailer bed (2) is on the trailer chassis, the hanging axis (14) is situated or approximately situated in a horizontal plane halfway between a front end (7) of the trailer bed (2) and the wheel axis (4).

7. A trailer in accordance with claim 1, wherein the first part of the lifting device (10) is disconnectable from the hanging axis (14) or trailer chassis.

8. A trailer in accordance with claim 1, further comprising means (19) to lock the trailer bed (2) to the trailer chassis when the trailer bed (2) is loaded on the trailer chassis.

9. A trailer in accordance with claim 1, wherein the trailer bed (2) at a bottom side at a rear end (8) opposite of a front end (7) is equipped with at least one foldable support (20).

10. A trailer in accordance with claim 1 wherein the lifting device (10) is foldable.

* * * * *